(12) United States Patent
Kattou et al.

(10) Patent No.: US 8,503,049 B2
(45) Date of Patent: Aug. 6, 2013

(54) DOCUMENT READING APPARATUS

(75) Inventors: Youhei Kattou, Matsudo (JP); Shigemichi Hamano, Abiko (JP); Nobuo Sekiguchi, Moriya (JP); Kenji Morita, Toride (JP); Akiko Kanno, Kashiwa (JP); Satoshi Seki, Abiko (JP); Akira Morisawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 13/260,144

(22) PCT Filed: Mar. 23, 2010

(86) PCT No.: PCT/JP2010/002022
§ 371 (c)(1),
(2), (4) Date: Sep. 23, 2011

(87) PCT Pub. No.: WO2010/113418
PCT Pub. Date: Oct. 7, 2010

(65) Prior Publication Data
US 2012/0013958 A1    Jan. 19, 2012

(30) Foreign Application Priority Data
Apr. 1, 2009  (JP) .................... 2009-089181

(51) Int. Cl.
*H04N 1/04* (2006.01)
*H04N 1/40* (2006.01)
*G03G 15/043* (2006.01)

(52) U.S. Cl.
USPC ........... 358/498; 358/486; 358/474; 358/448; 358/461; 358/497; 399/51

(58) Field of Classification Search
USPC ................. 358/486, 474, 498, 448, 461, 497; 399/51
See application file for complete search history.

(56) References Cited

U.S. PATENT DOCUMENTS 6,606,464 B2 * 8/2003 Asakawa .................... 399/51
6,963,430 B2 * 11/2005 Matsui ...................... 358/486

(Continued)

FOREIGN PATENT DOCUMENTS

| | | |
|---|---|---|
| JP | 4-135375 A | 5/1992 |
| JP | 11-150634 A | 6/1999 |
| JP | 11-196235 A | 7/1999 |
| JP | 2001-285583 A | 10/2001 |
| JP | 2006-74253 A | 3/2006 |

*Primary Examiner* — Charlotte M Baker
*Assistant Examiner* — Rury Grisham
(74) *Attorney, Agent, or Firm* — Canon USA Inc. IP Division

(57) ABSTRACT

A document reading apparatus includes a document positioning plate configured to position a document, a carriage configured to move a light source along the document positioning plate, a reading unit configured to read an image of a document illuminated by a light source of the carriage, a white reference member provided in the displacement range of the carriage, an input unit configured to input a reading start instruction for a document, and a control unit configured to move the carriage along the document positioning plate in response to a reading start instruction input via the input unit. The control unit moves the carriage to a first position at which the white reference member is provided, cause the reading unit to read the white reference member, moves the carriage to a second position that is an acceleration start position for accelerating toward the reading start position of the document positioning plate, and waits for a reading start instruction input from the input unit.

3 Claims, 5 Drawing Sheets

(56) References Cited

U.S. PATENT DOCUMENTS

| | | | |
|---|---|---|---|
| 7,755,814 B2 * | 7/2010 | Tamai et al. | 358/497 |
| 7,782,498 B2 * | 8/2010 | Hoshi | 358/474 |
| 7,969,623 B2 * | 6/2011 | Kagami et al. | 358/498 |
| 8,184,345 B2 * | 5/2012 | Inage | 358/448 |
| 2002/0149802 A1 * | 10/2002 | Aoki | 358/461 |
| 2010/0073737 A1 * | 3/2010 | Honda et al. | 358/474 |
| 2010/0165424 A1 * | 7/2010 | Maeda | 358/498 |

* cited by examiner

US 8,503,049 B2

DOCUMENT READING APPARATUS

CROSS REFERENCE TO RELATED APPLICATIONS

This application is a National Stage filing of PCT Application No. PCT/JP2010/002022 filed on Mar. 23, 2010, which claims priority from Japanese Patent Application No. 2009-089181 filed on Apr. 1, 2009, the disclosures of each of which are hereby incorporated by reference herein in their entirety.

TECHNICAL FIELD

The present invention relates to a document reading apparatus configured to move a document-scanning carriage along a document tray.

BACKGROUND ART

Conventionally, there is a need to reduce a first copy output time (FCOT) in a copying apparatus, that is to say, to reduce the time from a copy start instruction to the output of the first sheet. A technique for reducing the FCOT time in a copying apparatus by moving a document-scanning carriage to a position at which a white reference plate is arranged when a document tray changes from an open to closed position, and then by waiting for a copy start instruction, is discussed in Patent Citations 1 and 2.

In Patent Citation 1, a white reference plate is read according to a copy start instruction. In Patent Citation 2, a white reference plate is read without waiting for a copy start instruction. Both the proposals in Patent Citations 1 and 2 enable a reduction in the time from the copy start instruction to the start of document reading when compared with a configuration in which a carriage is moved to a white reference plate position after receiving a copy start instruction. These proposals are configured to accelerate the carriage from the white reference plate position upon receiving a copy start instruction and to scan the document on a document positioning glass plate.

CITATION LIST

Patent Literature

PTL 1: Japanese Patent Application Laid-Open No. 2001-285583.
PTL 2: Japanese Patent Application Laid-Open No. 04-135375.

SUMMARY OF INVENTION

Technical Problem

However there is a need for further improvement in document reading productivity, which requires the carriage to be moved at a high speed. As discussed in the above citations, a high output motor is required to accelerate the carriage, which is stationary at the white reference plate position near the document positioning glass plate, to a high-speed scanning speed within the distance to the document positioning glass plate. However, use of a high output motor increases the size and cost of the apparatus.

Use of a high output motor can be avoided by increasing the distance of the white reference plate position from the document positioning glass plate to thereby increase the carriage acceleration distance. However, although acceleration of the carriage to a high scanning speed is possible, the size of the apparatus is increased.

Solution to Problem

According to an aspect of the present invention, A document reading apparatus includes a document positioning plate configured to position a document, a carriage configured to move light illuminated on the document positioning plate along the document positioning plate, a reading unit configured to read an image of a document illuminated by a light source of the carriage, a white reference member provided in the displacement range of the carriage, an input unit configured to input a reading start instruction for a document, and a control unit configured to move the carriage along the document positioning plate in response to a reading start instruction input via the input unit, wherein the control unit is configured to move the carriage to a first position at which the white reference member is provided, cause the reading unit to read the white reference member, move the carriage to a second position, the second position being an acceleration start position for accelerating toward the reading start position of the document positioning plate, and wait for a reading start instruction input via the input unit.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Figure 1:
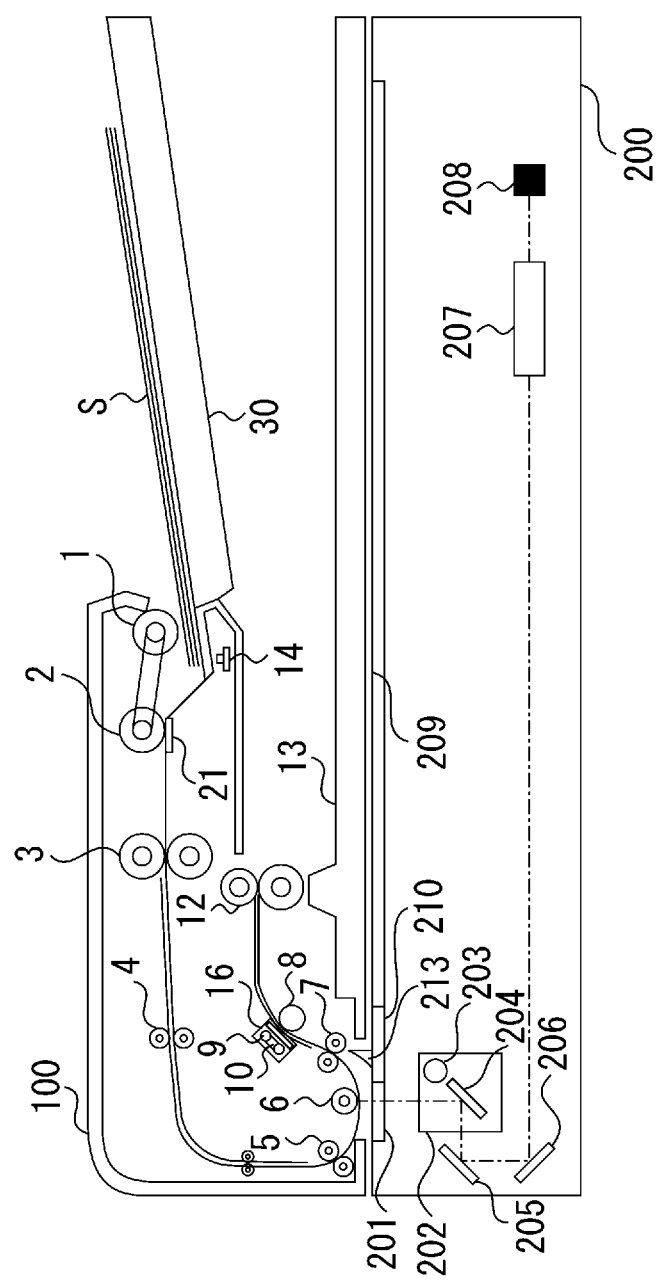
FIG. 1 is a sectional diagram of a document reading apparatus according to an exemplary embodiment of the present invention.

FIG. 1 is a sectional diagram of a document reading apparatus according to an exemplary embodiment of the present invention. The document reading apparatus includes a document reading unit 200 and an automatic document feeding unit (ADF) 100. The ADF 100 is configured to convey a document onto a flow reading glass plate of the document reading unit 200. The document reading unit 200 is configured to read (feeding-read) the surface of the document conveyed onto the flow reading glass plate 201 and to read (fix-read) the document on the document positioning glass plate 209. The ADF 100 is configured to feeding-read the rear surface of the document.

A document detection sensor 14 provided on a document tray 30 is configured to detect whether or not a document is present on the document tray 30. A feed roller 1 is configured to feed the uppermost document in a document bundle by rotating in contact with the document face of a document bundle S stacked in the document tray 30. Documents fed by the feed roller 1 are separated into single sheets by the operation of a separation roller 2 and a separation pad 21.

A separated document is conveyed to a registration roller 4 by a conveyance roller 3 and the document is abutted against the registration roller 4 to thereby correct skew during document conveyance. A document conveyed on the feed path by rotation of the registration roller 4 is positioned on a flow reading glass plate 201 by a platen upstream roller 4 and a platen roller 6. The surface (front face) of the document conveyed on the flow reading glass plate 201 is illuminated by a lamp 203 (light source).

The light reflected from the document passes through a minor 204, 205, 206 and a lens 207 and is incident upon a charged coupled device (CCD) line sensor 208 to thereby enable reading of the document surface image. The document conveyed by the platen roller 6 is conveyed through a platen downstream roller 7 to a rear surface reading roller 8.

The rear surface of the document conveyed between the rear surface reading roller 8 and the glass plate 16 is illuminated by a lamp 9 and the light reflected from the document is incident upon a CCD line sensor 10 to thereby enable reading of the rear surface image of the document. The document conveyed by the rear surface reading roller 8 is discharged into a sheet discharge tray 13 by a sheet discharge roller 12.

The document reading unit 200 is configured to read (fixed-read) a document on the document positioning glass plate 209 by moving a carriage 202 from below the flow reading glass plate 201 in a sub-scanning direction along the document positioning glass plate 209. The sub-scanning direction is a direction orthogonal to the array direction (main scanning direction) of the CCD line sensor 208. The document reading unit 200 positions the carriage 202 in a stationary position below the flow reading glass plate 201 and reads (flow reading) the document conveyed by the ADF 100.

The white reference plate (shading white plate or white reference member) 210 is a white plate configured to prepare white-level reference data to correct shading in the reading optical system of the document reading unit 200. The length in the main scanning direction of the white reference plate 210 must be greater than or equal to the document reading width, and the width in sub-scanning direction (document conveyance direction), which is orthogonal to the main scanning direction, must have a sufficient width to avoid adverse effects of particles, which may be attached to the white reference plate.

The white reference plate 210 is positioned within the displacement range of the carriage 202 between the document positioning glass plate 209 and the flow reading glass plate 201. The white reference plate 210 is read by the CCD line sensor 208 before reading of the document on the document positioning glass plate 209 or the reading of the document conveyed on the flow reading glass plate 201.

The white reference plate 210 is provided below a guide slope 213 configured to pick up a document conveyed on the flow reading glass plate 201 and to guide the document to the platen downstream roller 7. When the apparatus is configured to convey a document from the platen upstream roller 5 to the platen downstream roller 7, the guide slope 213 must be provided near the right side of the flow reading glass plate 201 in FIG. 1.

The white reference plate 210 may be basically provided at any position. However the size of the document reading apparatus can be reduced by overlapping the guide slope 213 and the white reference plate 210. If the white reference plate 210 is disposed near the left side of the flow reading glass plate 201, the size of the document reading apparatus will be increased unless the guide slope 213 provided on the right side of the flow reading glass plate 201 is not omitted.

When the guide slope 213 and the white reference plate 210 are provided on the left side of the flow reading glass plate 201, the document illustrated in FIG. 1 is conveyed from the right side of the flow reading glass plate 201 to the left side and the document tray 30 is positioned below the sheet discharge tray 13. Consequently operability is adversely affected when a user positions a document in the document tray 30. Therefore it is desirable that the white reference plate 210 is provided below the guide slope 213 between the document positioning glass plate 209 and the flow reading glass plate 201.

Figure 2:
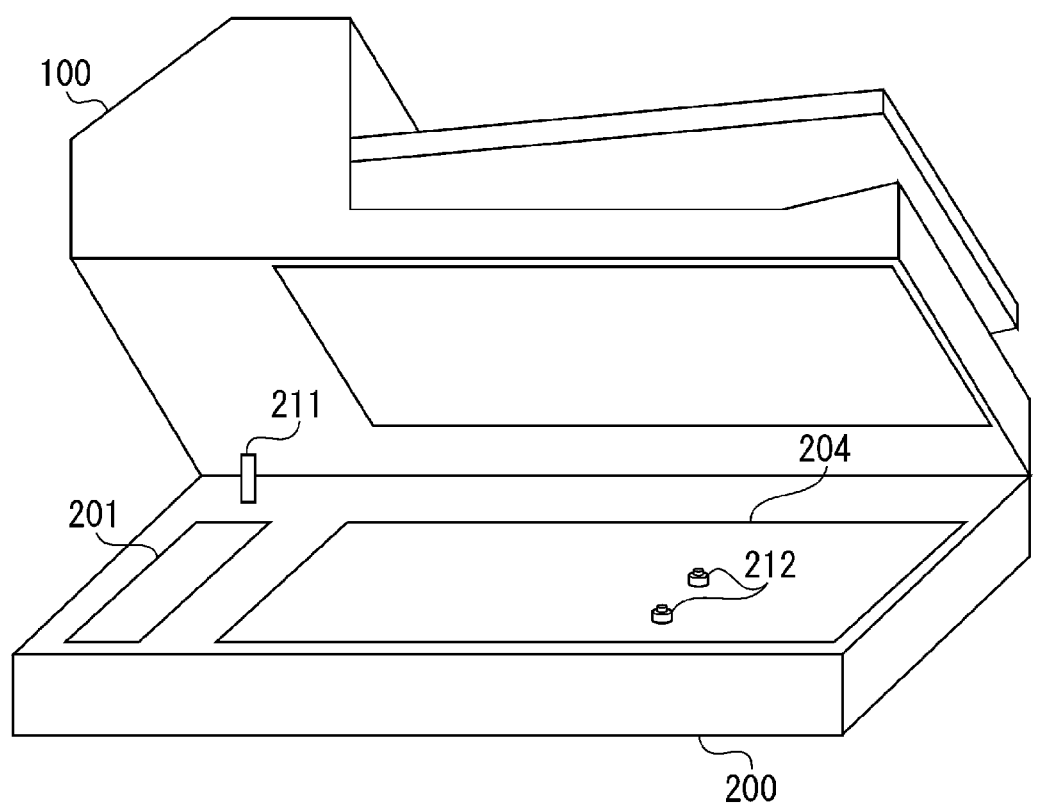
FIG. 2 illustrates an open/close detection mechanism of an ADF 100.

FIG. 2 illustrates an open/close detection mechanism of the ADF 100. The lower face of the sheet discharge tray 13 of the ADF 100 functions as a document pressing plate configured to press a document onto the document positioning glass plate 209. The ADF 100 is opened and closed by a user. The document reading unit 200 includes an open/close detection sensor 211 configured to detect an open or close state of the ADF 100. The open/close detection sensor 211 outputs a signal indicating a current state to a central processing unit (CPU) 901 when the ADF 100 is closed by a predetermined angle (for example, 30 degrees) relative to the document positioning glass plate 209.

The document reading unit 200 includes a size detection sensor 212 and is configured to determine a document size on the document positioning glass plate 209 according to a size detection sensor output that detects reflected light from a document illuminated by the lamp 203.

Figure 3:
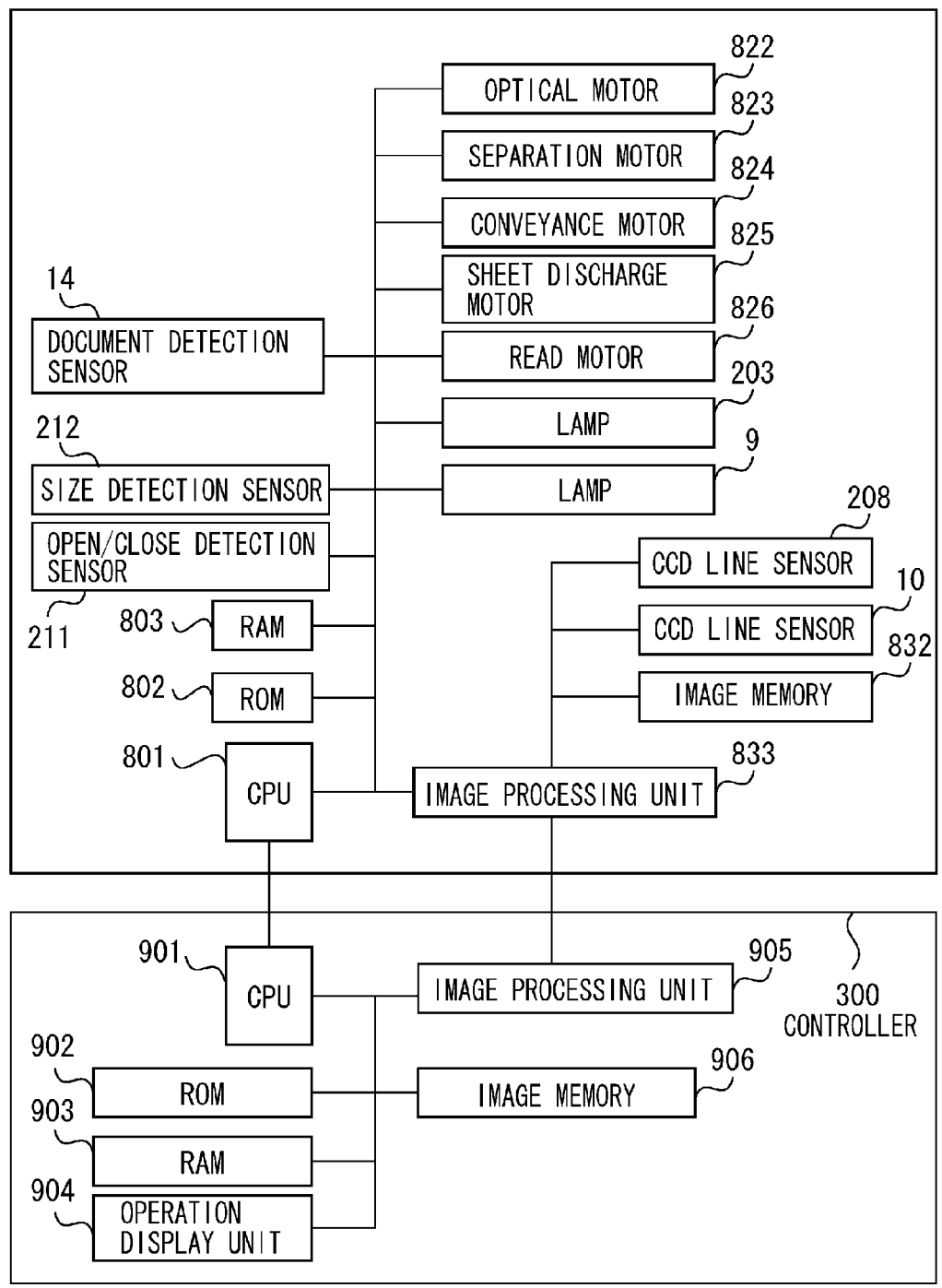
FIG. 3 is a block diagram illustrating control of a document reading apparatus.

FIG. 3 is a block diagram illustrating control of a document reading apparatus. A CPU 801 is configured to control the ADF 100 and the document reading unit 200. A control program is stored in a read only memory (ROM) 802 and input data or working data is stored in a random access memory (RAM) 803. The CPU 801 is configured to control a separation motor 823, a conveyance motor 824, a read motor 826, a sheet discharge motor 825, the lamp 203, and a lamp 9.

The separation motor 823 is configured to drive the feed roller 1 and the separation roller 2. The conveyance motor 824 is configured to drive the conveyance roller 3 and the registration roller 4. The read motor 826 is configured to drive the platen upstream roller 5, the platen roller 6, the platen downstream roller 7, and the rear surface reading roller 8. The sheet discharge motor 825 is configured to drive the sheet discharge roller 12. The CPU 801 is configured to control a motor 822, which is configured to move the carriage 202 in a sub-scanning direction.

The detection results from the document detection sensor 14, the open/close detection sensor 211 and the size detection sensor 212 are input to the CPU 801. Image data read by the CCD line sensors 10 and 208 are temporarily stored via an image processing unit 833 in an image memory 832.

The controller 300 includes a CPU 901, ROM 902, and RAM 903. The CPU 901 is configured to execute transmission/reception of data related to document reading control with the CPU 801. Image data is transferred via an image line from the image processing unit 833 to an image processing unit 905 and stored in an image memory 906. The controller 300 includes an operation display unit 904 configured to display set contents according to setting input by a user.

FIG. 4 illustrates displacement control of the carriage 202 during fixed reading. FIG. 4A illustrates a standby position (third position) of the carriage 202 when the ADF 100 is open.

The standby position is below the document positioning glass plate 209 and within the document positioning range of the document positioning glass plate 209. When it is detected that the ADF 100 has been closed by an angle of 30 degrees, the lamp 203 is turned on, and reflected light from the document on the document positioning glass plate 209 is incident on the CCD line sensor 208 via the carriage 202 to thereby enable detection of the presence or absence of a document and the size of the document in the main scanning direction.

Figure 4A:
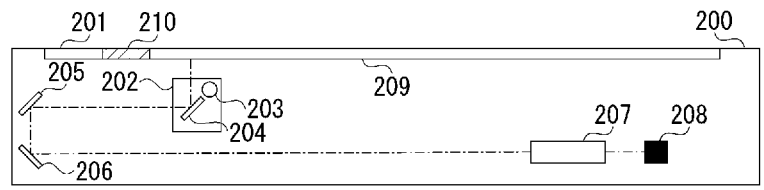
FIG. 4 illustrates displacement control of a carriage 202 during fixed reading.
Figure 4B:
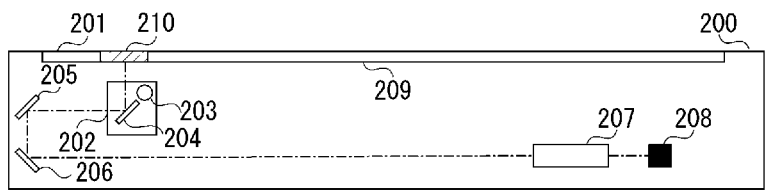

FIG. 4B illustrates a reading position (first position) of the white reference plate 210. After detection of the presence or absence of a document, and the size of the document in the main scanning direction, the carriage 202 moves to the white reference plate reading position, and the white reference plate 210 is read by the CCD line sensor 208 via the carriage 202.

Figure 4C:
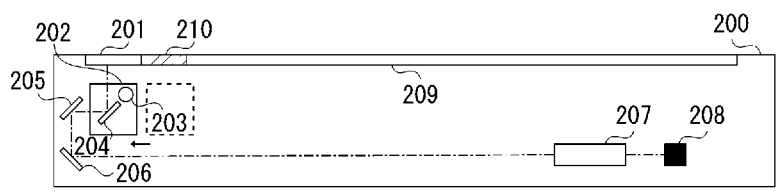

FIG. 4C illustrates an acceleration start position (second position) of the carriage 202. The acceleration start position differs from the white reference plate reading position. The distance between the acceleration start position and the document positioning glass plate 209 is larger than the distance between the white reference plate reading position and the document positioning glass plate 209. The distance between the acceleration start position and the document positioning glass plate 209 is a position from which the carriage 202 can be accelerated to a target speed by the motor 822 before the carriage 202 reaches the document positioning glass plate 209. After reading the white reference plate 210, the carriage 202 moves to the acceleration start position and waits for a reading start instruction (input by a user pressing a start key) via the operation display unit 904 to input.

Figure 4D:
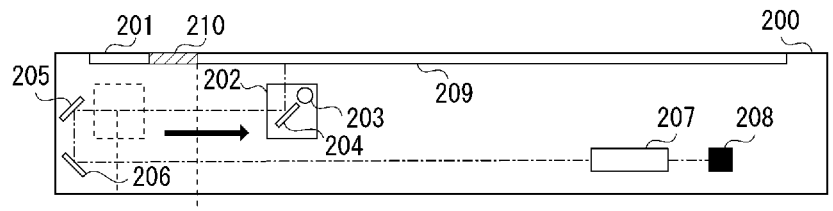

FIG. 4D illustrates the position of the carriage 202 during reading and scanning of a document on the document positioning glass plate 209. The carriage 202 is accelerated according to a reading start instruction from the acceleration start position toward the reading start position to thereby scan the document positioning glass plate 209.

Figure 4E:
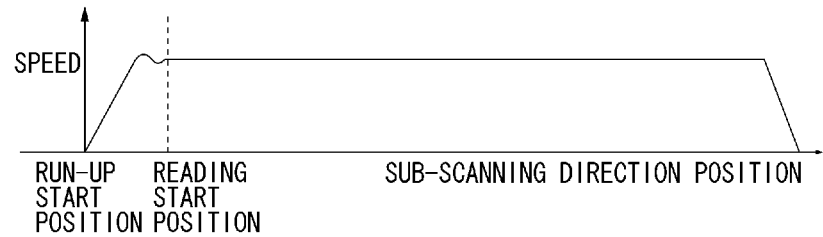

FIG. 4E is a graph illustrating the speed of the carriage 202 when moving from the acceleration start position in the sub-scanning direction. As illustrated in FIG. 4E, the speed of the carriage 202 is controlled so that the carriage reaches the target speed and keeps stably the target speed before the carriage 202 reaches the reading start position (left end of the document positioning glass plate 209 in FIG. 4).

In other words, vibration caused by overshoot has been sufficiently eliminated before the carriage 202 reaches the reading start position. Therefore, an adverse effect on image quality caused by the speed variation of the carriage 202 during document scanning can be avoided.

Figure 5:
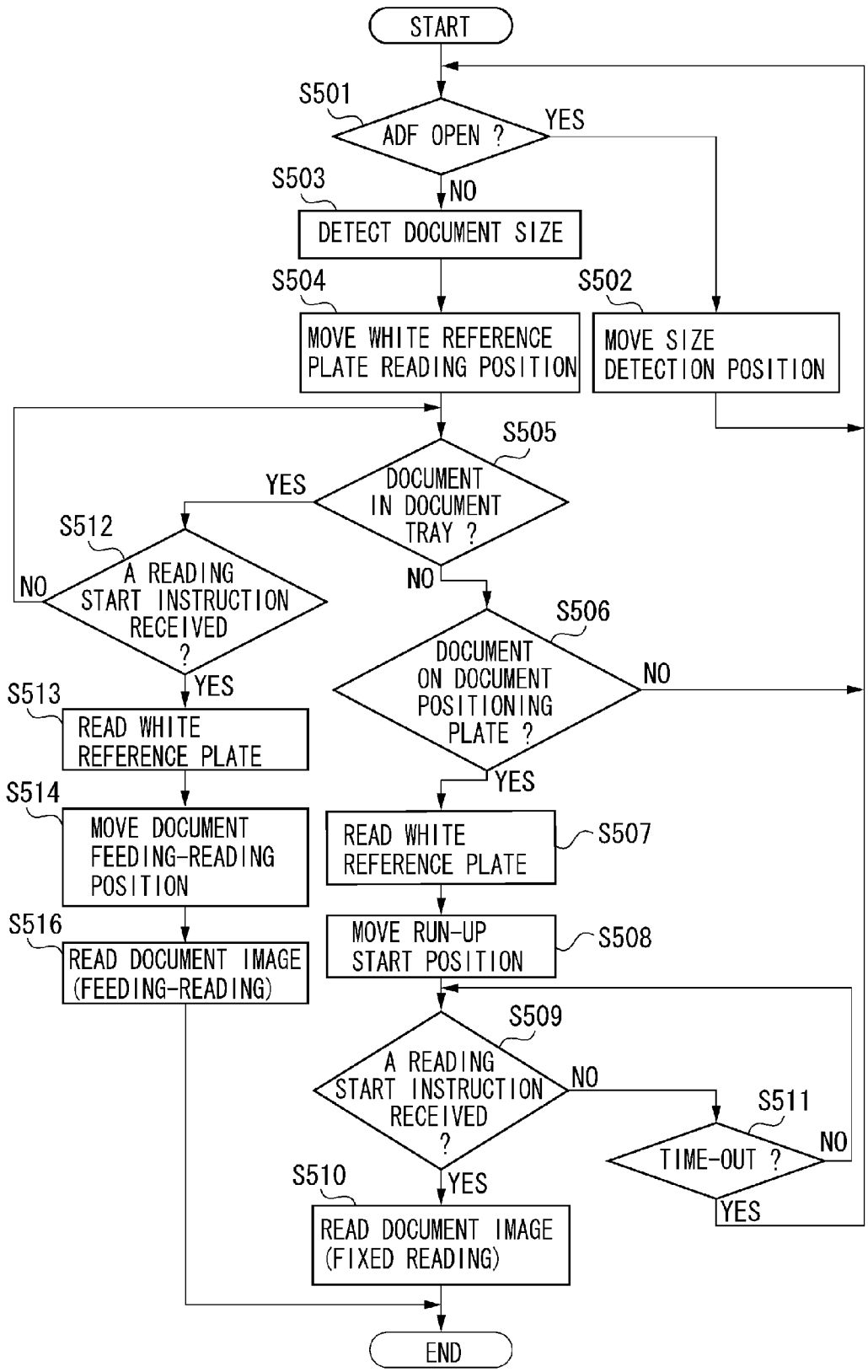
FIG. 5 is a flowchart illustrating processing executed by a CPU 801.

FIG. 5 is a flowchart illustrating processing executed by the CPU 801. The programs for executing the processing illustrated in the flowchart are stored in the ROM 802 and are read and executed by the CPU 801.

Firstly in step S501, the CPU 801 uses the detection result of the open/close detection sensor 211 to determine whether the ADF 100 is open. When the ADF 100 is open (YES in step S501), in step S502, the motor 822 is driven to move the carriage 202 to the size detection position (see FIG. 4A).

When it is detected in step S501 that the ADF 100 is closed by an angle of 30 degrees from an open state (NO in step S501), in step S503, the lamp 203 is turned on, and reflected light received by the CCD line sensor 208 is used to detect the presence or absence of a document on the document positioning glass plate 209 and the size of the document in the main scanning direction. Then in step S504, the CPU 801 operates the motor 822 to move the carriage 202 to the white reference plate reading position (FIG. 4B).

Then in step S505, the CPU 801 uses the detection results of the document detection sensor 14 to determine whether a document is present in the document tray 30. When there is no document in the document tray 30 (NO in step S505), in step S506, the detection results of step S503 are used to determine whether there is a document positioned on the document positioning glass plate 209.

When there is not a document on the document positioning glass plate 209 (NO in step S506), the process returns to step S501. When there is a document (YES in step S506), the process proceeds to step S507. In step S507, the lamp 203 is turned on, and the CCD line sensor 208 reads the white reference plate 210 illuminated by the lamp 203. The image data read from the white reference plate 210 is used by the image processing unit 833 to calculate a shading correction value.

After reading the white reference plate 210, in step S508, the CPU 801 drives the motor 822 to move the carriage 202 to the acceleration start position (FIG. 4C). Then in step S509, the CPU 801 determines the presence or absence of a reading start instruction from the CPU 901. The CPU 901 outputs a reading start instruction to the CPU 801 in response to a reading start instruction (input by a user pressing a start key) from the operation display unit 904.

The CPU 801 drives the motor 822 to move the carriage 202 from the acceleration start position in the sub-scanning direction when a reading start instruction is received in step S509 (YES in step S509). The CPU 801 controls the motor 822 so that the carriage 202 reaches the target speed and keeps stably the target speed before the carriage 202 reaches the reading start position (left end of the document positioning glass plate 209 in FIG. 4A to FIG. 4D).

In step S510, the CPU 801 transfers image data output from the CCD line sensor 208, which is obtained by reading the document image on the document positioning glass plate 209, via the image processing unit 833 to the image processing unit 905 of the controller 300. In this manner, after the white reference plate 210 is read, the carriage 202 is moved to the acceleration start position and waits for a reading start instruction. Consequently FCOT can be reduced by enabling instantaneous startup of document scanning by the carriage 202 in response to a reading start instruction.

When a reading start instruction is not received in step S509 (NO in step S509), in step S511, it is determined whether a predetermined time has elapsed (time-out) since the white reference plate 210 is read. Until the predetermined time elapses (NO in step S511), the process returns to step S509 and waits for a reading start instruction.

When the predetermined time has elapsed in step S511 (YES in step S511), the process returns to step S501. When the process has returned from step S511 to step S501 and the ADF 100 is still closed, in step S504, the carriage 202 is moved to the white reference plate reading position and in step S507, the white reference plate 210 is read. Then in step S508, the carriage 202 is moved again to the acceleration start position.

With time elapsing from reading of the white reference plate 210, since the reading characteristics of the CCD line sensor 208 may be affected by temperature changes or the like in the CCD line sensor 208, the white reference plate 210 is re-read at each predetermined interval and is corrected according to changes in the reading characteristics.

After reading the white reference plate 210, since the carriage 202 is moved to the acceleration start position, immediate document scanning by the carriage 202 is possible in response to a reading start instruction, thereby enabling a reduction of FCOT.

When a document is present in the document tray 30 (YES in step S505), in step S512, the CPU 801 determines whether or not a reading start instruction from the CPU 901 is received.

In step S512, when there is not a reading start instruction (NO in step S512), the process returns to step S505. On the other hand, when there is a reading start instruction (YES in step S512), the lamp 203 is turned on and, in step S513, the white reference plate 210 is read by the CCD line sensor 208.

After reading the white reference plate 210, in step S514, the CPU 801 drives the optical motor 822 to move the carriage 202 to the flow reading position below the platen roller 6. Then the CPU 801 turns the lamp 203 on, drives the separation motor 823, the conveyance motor 824, the read motor 826, and the sheet discharge motor 825, and conveys the document to the flow reading glass plate 201.

In step S516, image data, which is obtained by reading the document image moving on the flow reading glass plate 201 and output from the CCD line sensor 208, is transferred via the image processing unit 833 to the image processing unit 905 of the controller 300.

In the above-described exemplary embodiments, although positional control of the carriage 202 is executed according to open/close detection of the ADF 100, the control can be applied to a document reading apparatus not including an ADF. More specifically, positional control of the above type of carriage 202 can be executed according to open/close detection of a pressing plate that presses a document towards the document positioning glass plate 209.

In the above-described exemplary embodiments, although the carriage 202 is moved to the acceleration start position when the ADF 100 is closed and a document is present on the document positioning glass plate 209, the present invention is not limited thereto. For example, when the ADF 100 is closed, a document is present on the document positioning glass plate 209, and a user input an instruction using the operation display unit 904, the carriage 202 may be moved to the acceleration start position.

Furthermore, in the above-described exemplary embodiments, although the minor 204 and the lamp 203 are provided on the carriage 202, and the CCD line sensor 208 is provided in a position other than the carriage 202, the present invention is not limited thereto. For example, the present invention may be configured to have a contact image sensor on the carriage 202 or to have a CCD line sensor and a compact optical system on the carriage 202.

In the above-described exemplary embodiments, although a reading start instruction is input from the operation display unit 904, such instructions may be input from driver software in a personal computer connected by a communication unit to the document reading apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

REFERENCE SIGNS LIST

100 ADF
200 DOCUMENT READING UNIT
202 CARRIAGE
203 CCD LINE SENSOR
209 DOCUMENT POSITIONING GLASS PLATE
210 WHITE REFERENCE PLATE
211 OPEN/CLOSE DETECTION SENSOR
801 CPU
822 MOTOR
828 LAMP
833 IMAGE PROCESSING UNIT

The invention claimed is:

1. A document reading apparatus comprising:
a platen;
a carriage configured to move along the platen and have a light source that illuminates a document placed on the platen;
a reading unit configured to read the document illuminated by the light source;
a document feeding unit configured to convey the document onto a document flow reading plate;
a white reference member located between the platen and the document flow reading plate; and
an input unit configured to input a reading start instruction,
wherein, in a first case where the document fed by the document feeding unit is read, the carriage moves to a first position corresponding to the document flow reading plate and the reading unit reads the fed document, and
wherein, in a second case where the document placed on the platen is read, the carriage moves to a second position corresponding to the white reference member and the reading unit reads the white reference member, and subsequently, the reading unit moves to a run-up start position and waits for a reading start instruction to be input, and thereafter,
in a case where the reading start instruction is input before a predetermined time has elapsed since the reading unit reads the white reference member, the reading unit reads the document placed on the platen while the carriage moves from the run-up start position along the platen, and
in a case where the predetermined time has elapsed since the reading unit reads the white reference member, the carriage moves from the run-up start position to the second position and the reading unit reads the white reference member, and subsequently, the reading unit moves to the run-up start position and waits for the reading start instruction to be input.

2. The document reading apparatus according to claim 1, wherein a distance between the run-up start position and a reading start position is longer than a distance between the second position and the reading start position, and
wherein the reading unit starts to read the document placed on the platen from the reading start position.

3. The document reading apparatus according to claim 2, wherein the distance between the run-up start position and the reading start position is a distance necessary to stabilize a speed of the carriage at a target speed at the reading start position.

* * * * *